US008548662B2

(12) United States Patent
Kishi et al.

(10) Patent No.: US 8,548,662 B2
(45) Date of Patent: Oct. 1, 2013

(54) TRANSMISSION CONTROL FOR A HYBRID ELECTRIC VEHICLE WITH REGENERATIVE BRAKING (75) Inventors: Takayuki Kishi, Wako (JP); Hisashi Ishikawa, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 59 days.

(21) Appl. No.: 13/285,482

(22) Filed: Oct. 31, 2011

(65) Prior Publication Data

US 2012/0123621 A1 May 17, 2012

(30) Foreign Application Priority Data

Nov. 11, 2010 (JP) .................................. 2010-252926

(51) Int. Cl.
*B60L 9/00* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| | | | |
|---|---|---|---|
| 5,542,754 A | 8/1996 | Aoki et al. | |
| 5,923,093 A | 7/1999 | Tabata et al. | |
| 2008/0318728 A1* | 12/2008 | Soliman et al. | 477/4 |
| 2009/0149295 A1* | 6/2009 | Yamamoto et al. | 477/109 |
| 2009/0150035 A1* | 6/2009 | Soliman et al. | 701/54 |
| 2010/0009807 A1* | 1/2010 | Umakoshi et al. | 477/73 |
| 2010/0304922 A1 | 12/2010 | Ohkubo et al. | |
| 2012/0038208 A1* | 2/2012 | Matsushita | 303/3 |

FOREIGN PATENT DOCUMENTS

| | | |
|---|---|---|
| EP | 2 474 434 A1 | 7/2012 |
| JP | 7-264711 A | 10/1995 |
| JP | 10-73161 A | 3/1998 |
| JP | 2001-165305 A | 6/2001 |
| JP | 2007-99163 A | 4/2007 |
| JP | 2009-132270 A | 6/2009 |
| JP | 2009-166611 A | 7/2009 |
| JP | 2009-179208 A | 8/2009 |
| JP | 2010-83454 A | 4/2010 |
| JP | 2010-089537 A | 4/2010 |
| WO | 2011/043347 A1 | 4/2011 |
| WO | 2012/053605 A1 | 4/2012 |

OTHER PUBLICATIONS

Japanese Office Action dated Jul. 23, 2012, issued in corresponding Japanese Patent Application No. 2010-252926, (4 pages).

* cited by examiner

*Primary Examiner* — James Trammell
*Assistant Examiner* — Michael D Lang
(74) *Attorney, Agent, or Firm* — Westerman, Hattori, Daniels & Adrian, LLP (57) ABSTRACT

The present invention provide a hybrid vehicle comprising a first and a second transmission mechanisms, an electric motor connected to the first transmission mechanism, an internal combustion engine, a motor control unit and a transmission control unit. The transmission control unit changes, when the motor control unit executes a decelerating regeneration in response to a braking request of a driver, and when a braking request amount of the braking request is decreased by a predetermined amount while a predetermined shift range attained by the first transmission mechanism is selected, a shift range to a shift range on a lower-speed side than the predetermined shift range, which is attained by the first transmission mechanism, and to maintain the predetermined shift range when the braking request amount is not decreased.

11 Claims, 9 Drawing Sheets

TRANSMISSION CONTROL FOR A HYBRID ELECTRIC VEHICLE WITH REGENERATIVE BRAKING

BACKGROUND OF THE INVENTION

1. Field of the Invention

The present invention relates to a hybrid vehicle including an electric motor and internal combustion engine.

2. Description of the Related Art

As an automatic transmission, a so-called dual clutch transmission is known. The dual clutch transmission includes two transmission mechanisms which realize different shift ranges. Also, a hybrid vehicle which is provided with such dual clutch transmission and can attain decelerating regeneration (regenerative braking) has been proposed.

In general, shift ranges are changed based on a traveling state of a vehicle such as a vehicle speed. However, when the decelerating regeneration is performed to have a braking operation of a driver as a trigger, and a shift down operation is made based on a traveling state, power transmission between the electric motor and drive wheels is temporarily interrupted.

SUMMARY OF THE INVENTION

An object of the present invention is to eliminate unnatural feeling of a driver and to suppress an insufficient collection of electric power in association with a shift change operation during decelerating regeneration.

According to one aspect of the present invention, there is provided a hybrid vehicle comprising a first transmission mechanism and a second transmission mechanism, an electric motor connected to the first transmission mechanism, an internal combustion engine, an output shaft of the internal combustion engine capable of engaging with a first input shaft of the first transmission mechanism and a second input shaft of the second transmission mechanism, a motor control unit configured to execute decelerating regeneration by the electric motor during a braking request of a driver, and a transmission control unit configured to change, when the motor control unit executes the decelerating regeneration in response to the braking request of the driver, and when a braking request amount of the braking request is decreased by a predetermined amount while a predetermined shift range attained by the first transmission mechanism is selected, a shift range to a shift range on a lower-speed side than the predetermined shift range, which is attained by the first transmission mechanism, and to maintain the predetermined shift range when the braking request amount is not decreased.

Further features of the present invention will become apparent from the following description of exemplary embodiments (with reference to the attached drawings).

DESCRIPTION OF THE EMBODIMENTS

<First Embodiment>
<Schematic Arrangement>

Figure 1:
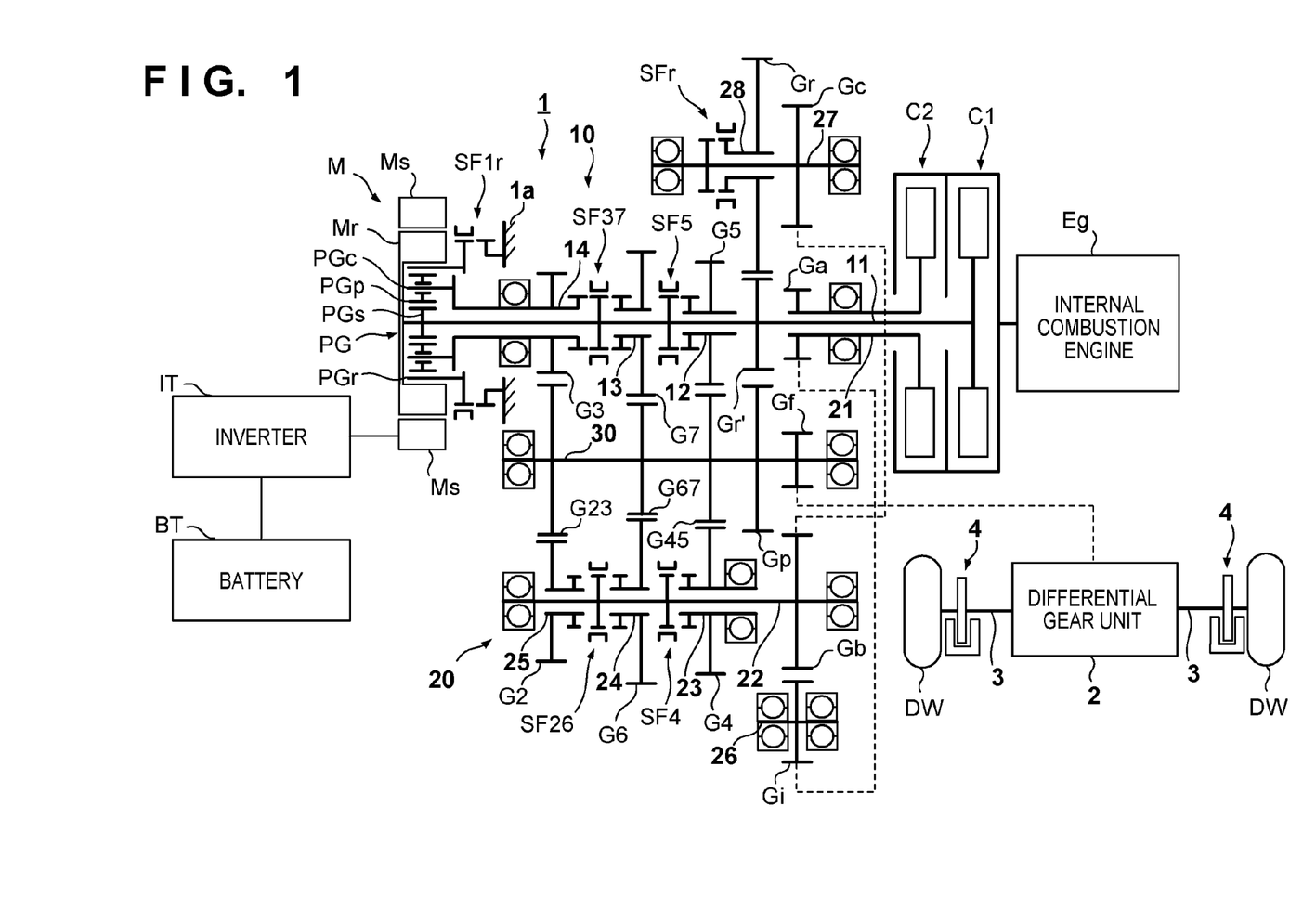
FIG. 1 is a schematic view showing a driving system of a hybrid vehicle according to one embodiment of the present invention.

FIG. 1 is a schematic view showing a driving system (driving apparatus) of a hybrid vehicle according to one embodiment of the present invention, and especially shows the arrangement around a transmission 1 using a skeleton view. A brief description will be given below.

The driving apparatus for a vehicle is used in a vehicle provided with an internal-combustion engine Eg and an electric motor M as prime movers. The driving apparatus is capable of changing speed of mechanical power from the internal-combustion engine Eg and the motor M by a transmission mechanism 1 and outputting the power for rotating driving wheels DW. A driving force output from the internal combustion engine Eg or the electric motor M is transmitted to drive axles 3 through the transmission 1 and a differential gear unit 2, and rotates drive wheels DW to obtain a driving power of the hybrid vehicle, thereby accelerating the vehicle. Also, a braking force of the hybrid vehicle is obtained by decelerating regeneration by the electric motor M or braking devices 4, thus decelerating the vehicle.

The transmission mechanism 1 includes a first transmission mechanism 10 and a second transmission mechanism 20. The internal combustion engine Eg is, for example, a gasoline engine or a diesel engine, and clutches C1 and C2 are connected to its output shaft (crankshaft) as startup devices. The clutch C1 engages/disengages a first transmission mechanism 10 (especially, a main shaft 11) of the transmission 1 and the internal combustion engine Eg. The clutch C2 engages/disengages a second transmission mechanism 20 (especially, a main shaft 21) of the transmission 1 and the internal combustion engine Eg. The clutches C1 and C2 are, for example, frictional disc clutches or wet disc clutches.

The electric motor M is, for example, a three-phase brushless motor, and includes a rotor Mr and stator Ms. The electric motor M receives a supply of electric power stored in a battery BT through an inverter IT to output a driving force (powering). Also, the electric motor M functions as a generator, and stores electric power in the battery BT through the inverter IT (regeneration). The electric motor M can obtain a braking force using a rotational resistance generated in the rotor Mr at the time of regeneration. The battery BT is a secondary battery, for example, a Li-ion battery or a Ni-MH battery.

In this embodiment, the electric motor M is connected to the first transmission mechanism 10. More specifically, the electric motor M is arranged coaxially with the main shaft 11 of the first transmission mechanism 10, the rotor Mr of the electric motor M is fixed to an end portion of the main shaft 11 of the first transmission mechanism 10, and the rotor Mr is rotated coaxially with the main shaft 11. For this reason, the rotational force of the main shaft 11 is always transmitted to the rotor Mr. In the arrangement of this embodiment, the main shaft 11 and rotor Mr are fixed. However, an arbitrary arrangement which always transmits the rotational force of the main shaft 11 to the electric motor M can be adopted.

The differential gear unit 2 includes a final gear and a differential mechanism connected to the drive axles 3, and transmits a driving force with the transmission 1 through an output gear Gf of the transmission 1. The braking devices 4 are frictional braking devices. In the example shown in FIG.

1, as each braking device 4, a disc brake including a caliper on the side of a vehicle body and a brake disc on the side of the drive wheel DW or drive axle 3 is assumed. However, other frictional braking devices such as drum brakes can be adopted.

In this embodiment, each braking device 4 is of a brake-by-wire type, and a braking request of the driver is always issued through a control unit 40 (to be described later). Since the braking devices 4 of the brake-by-wire type are adopted, a distribution of the braking devices 4 and the decelerating regeneration by the electric motor M at the time of braking can be arbitrarily controlled, and control that prioritizes the decelerating regeneration can be made. For this reason, an insufficient collection of electric power by the electric motor M can be suppressed.

<Arrangement of Transmission>

The transmission 1 is that having seven forward shift ranges and one reverse shift range, and is a dual clutch transmission including, as principal components, the first transmission mechanism 10 and clutch C1 which realize odd shift ranges, and the second transmission mechanism 20 and clutch C2 which realize even shift ranges and a reverse shift range.

The first transmission mechanism 10 is capable of receiving the mechanical power from the engine output shaft by the main shaft (first input shaft) 11 to change the speed by any one of a plurality of gear positions and outputting the power for rotating the driving wheels DM. The clutch (first clutch) C1 is capable of engaging the engine output shaft with the main shaft 11.

The first transmission mechanism 10 includes the main shaft 11, one end portion of which is fixed to the clutch C1 and the other end portion of which is connected to the rotor Mr of the electric motor M. A driven gear Gr' is fixed to the main shaft 11. The driven gear Gr' always meshes with a reverse driving gear Gr.

A sun gear PGs of a planetary gear train PG is fixed to the other end portion of the main shaft 11. The planetary gear train PG is arranged coaxially with the main shaft 11, and includes the sun gear PGs, a ring gear PGr, a pinion gear PGp which meshes with the sun gear PGs and ring gear PGr, and a carrier PGc which rotatably supports the pinion gear PGp and is rotatable about the main shaft 11.

The carrier PGc is a cylindrical member coaxial with the main shaft 11, and is supported by a coupling shaft 14 which is rotatably supported to be coaxial with the main shaft 11. A 3rd-speed driving gear G3 is fixed to the coupling shaft 14. The coupling shaft 14, the carrier PGc and pinion gear PGp, and the driving gear G3 are integrally rotatable to be coaxial with the main shaft 11.

Coupling shafts 12 and 13 are cylindrical members coaxial with the main shaft 11, and are rotatably supported to be coaxial with the main shaft 11. A 5th-speed driving gear G5 is fixed to the coupling shaft 12. A 7th-speed driving gear G7 is fixed to the coupling shaft 13. The coupling shaft 12, driving gear G5, coupling shaft 13, and driving gear G7 are integrally rotatable to be coaxial with the main shaft 11.

A 1st-speed/reverse shifter SF1*r* attains engagement/disengagement between the ring gear PGr of the planetary gear train PG and a transmission case 1*a*. A 3rd/7th-speed shifter SF37 attains engagement/disengagement between the main shaft 11 and the coupling shaft 14 (driving gear G3), and that between the main shaft 11 and coupling shaft 13 (driving gear G7). A 5th-speed shifter SF5 attains engagement/disengagement between the main shaft 11 and coupling shaft 12 (driving gear G5). These shifters are engaging mechanisms such as dog clutches or brakes.

The second transmission mechanism 20 is capable of receiving the mechanical power from the engine output shaft by the main shaft (second input shaft) 21 to change the speed by any one of a plurality of gear positions and outputting the power for rotating the driving wheels DM. The clutch (second clutch) C2 is capable of engaging the engine output shaft with the main shaft 21.

The second transmission mechanism 10 includes the main shaft 21 which is a cylindrical member coaxial with the main shaft 11, and is rotatably supported to be coaxial with the main shaft 11. The clutch C2 is fixed to one end portion of the main shaft 21. A gear Ga is fixed to the other end portion of the main shaft 21.

The second transmission mechanism 10 includes an idle shaft 26 and intermediate shaft 22, which are rotatably arranged to be parallel to the main shaft 11. An idle gear Gi which always meshes with the gear Ga is fixed to the idle shaft 26. A gear Gb which always meshes with the idle gear Gi is fixed to the intermediate shaft 22.

Coupling shafts 23 to 25 are cylindrical members coaxial with the intermediate shaft 22, and are rotatably supported to be coaxial with the intermediate shaft 22. A 4th-speed driving gear G4 is fixed to the coupling shaft 23. A 6th-speed driving gear G6 is fixed to the coupling shaft 24. A 2nd-speed driving gear G2 is fixed to the coupling shaft 25. The driving gears G2, G4 and G6 are integrally rotatable to be coaxial with the intermediate shaft 22.

A 2nd/6th-speed shifter SF26 attains engagement/disengagement between the intermediate shaft 22 and coupling shaft 25 (driving gear G2), and that between the intermediate shaft 22 and coupling shaft 24 (driving gear G6). A 4th-speed shifter SF4 attains engagement/disengagement between the intermediate shaft 22 and coupling shaft 23 (driving gear G4). These shifters are engaging mechanisms such as dog clutches.

The second transmission mechanism 10 also includes an intermediate shaft 27, which is rotatably arranged to be parallel to the main shaft 11. A gear Gc which always meshes with the gear Gb is fixed to the intermediate shaft 27. A coupling shaft 28 is a cylindrical member coaxial with the intermediate shaft 27, and is rotatably supported to be coaxial with the intermediate shaft 27. The reverse driving gear Gr is fixed to the coupling shaft 28. A reverse shifter SFr attains engagement/disengagement between the intermediate shafts 27 and 28 (driving gear Gr). This shifter SFr is an engaging mechanism such as a dog clutch.

The transmission 1 includes a counter shaft 30 which is rotatably arranged to be parallel to the main shaft 11. The output gear Gf which always meshes with the final gear of the differential gear unit 2, a parking gear Gp which configures a packing lock mechanism, a 4th/5th-speed driven gear G45, a 6th/7th-speed driven gear G67, and a 2nd/3rd-speed driven gear G23 are fixed to the counter shaft 30.

The driven gear G45 always meshes with the driving gears G4 and G5. The driven gear G67 always meshes with the driving gears G6 and G7. The driven gear G23 always meshes with the driving gears G2 and G3.

A mode upon selection of respective shift ranges of the transmission 1 with the above arrangement when the internal combustion engine Eg is used as a driving source will be described below. Cases of the 1st-, 3rd-, 5th-, and 7th-speed shift ranges will be described first. Upon selection of these shift ranges, the clutch C1 is set in an engaged state, and the clutch C2 is set in a disengaged state.

In case of the 1st-speed shift range, the shifter SF1*r* sets the ring gear PGr of the planetary gear train PG and the transmission case 1*a* in an engaged state. Then, a driving force is transmitted along a route [internal combustion engine Eg→clutch C1→main shaft 11•sun gear PGs→pinion gear PGp•carrier PGc•coupling shaft 14•driving gear G3→driven gear G23•counter shaft 30•output gear Gf→differential gear unit 2], thus attaining the 1st-speed shift range.

In case of the 3rd-speed shift range, the shifter SF37 sets the main shaft 11 and coupling shaft 14 in an engaged state. Then, a driving force is transmitted along a route [internal combustion engine Eg→clutch C1→main shaft 11•coupling shaft 14•driving gear G3→driven gear G23•counter shaft 30•output gear Gf→differential gear unit 2], thus attaining the 3rd-speed shift range.

In case of the 5th-speed shift range, the shifter SF5 sets the main shaft 11 and coupling shaft 12 in an engaged state. Then, a driving force is transmitted along a route [internal combustion engine Eg→clutch C1→main shaft 11•coupling shaft 12•driving gear G5→driven gear G45•counter shaft 30•output gear Gf→differential gear unit 2], thus attaining the 5th-speed shift range.

In case of the 7th-speed shift range, the shifter SF37 sets the main shaft 11 and coupling shaft 13 in an engaged state. Then, a driving force is transmitted along a route [internal combustion engine Eg→clutch C1→main shaft 11•coupling shaft 13•driving gear G7→driven gear G67→counter shaft 30•output gear Gf→differential gear unit 2], thus attaining the 7th-speed shift range.

Upon selection of the 2nd-, 4th-, and 6th-speed shift ranges, the clutch C1 is set in a disengaged state, and the clutch C2 is set in an engaged state.

In case of the 2nd-speed shift range, the shifter SF26 sets the intermediate shaft 22 and coupling shaft 25 in an engaged state. Then, a driving force is transmitted along a route [internal combustion engine Eg→clutch C2→main shaft 21•gear Ga→idle gear Gi→gear Gb•intermediate shaft 22•coupling shaft 25•driving gear G2→driven gear G23→counter shaft 30•output gear Gf→differential gear unit 2], thus attaining the 2nd-speed shift range.

In case of the 4th-speed shift range, the shifter SF4 sets the intermediate shaft 22 and coupling shaft 23 in an engaged state. Then, a driving force is transmitted along a route [internal combustion engine Eg→clutch C2→main shaft 21•gear Ga→idle gear Gi→gear Gb•intermediate shaft 22•coupling shaft 23•driving gear G4→driven gear G45•counter shaft 30•output gear Gf→differential gear unit 2], thus attaining the 4th-speed shift range.

In case of the 6th-speed shift range, the shifter SF26 sets the intermediate shaft 22 and coupling shaft 24 in an engaged state. Then, a driving force is transmitted along a route [internal combustion engine Eg→clutch C2→main shaft 21•gear Ga→idle gear Gi→gear Gb•intermediate shaft 22•coupling shaft 24•driving gear G6→driven gear G67•counter shaft 30•output gear Gf→differential gear unit 2], thus attaining the 6th-speed shift range.

In this manner, the 1st- to 7th-speed shift ranges can be attained. When the shift ranges are shifted up or down level by level, the shifter can change the current shift range to the next shift range and can wait for changing of engagement/disengagement of the clutches C1 and C2, thus shortening a shift change time.

Upon selection of the reverse shift range, the clutch C1 is set in a disengaged state, and the clutch C2 is set in an engaged state. Then, the shifter SFr sets the intermediate shaft 27 and coupling shaft 28 in an engaged state, and the shifter SF1r sets the ring gear PGr of the planetary gear train PG and the transmission case 1a in an engaged state. Then, a driving force is transmitted along a route [internal combustion engine Eg→clutch C2→main shaft 21•gear Ga→idle gear Gi→gear Gb→gear Gc•intermediate shaft 27•coupling shaft 28•driving gear Gr→driven gear Gr'•main shaft 11•sun gear PGs→pinion gear PGp•carrier PGc•coupling shaft 14•driving gear G3→driven gear G23•counter shaft 30•output gear Gf→differential gear unit 2], thus attaining the reverse shift range.

<Control Unit>

Figure 2:
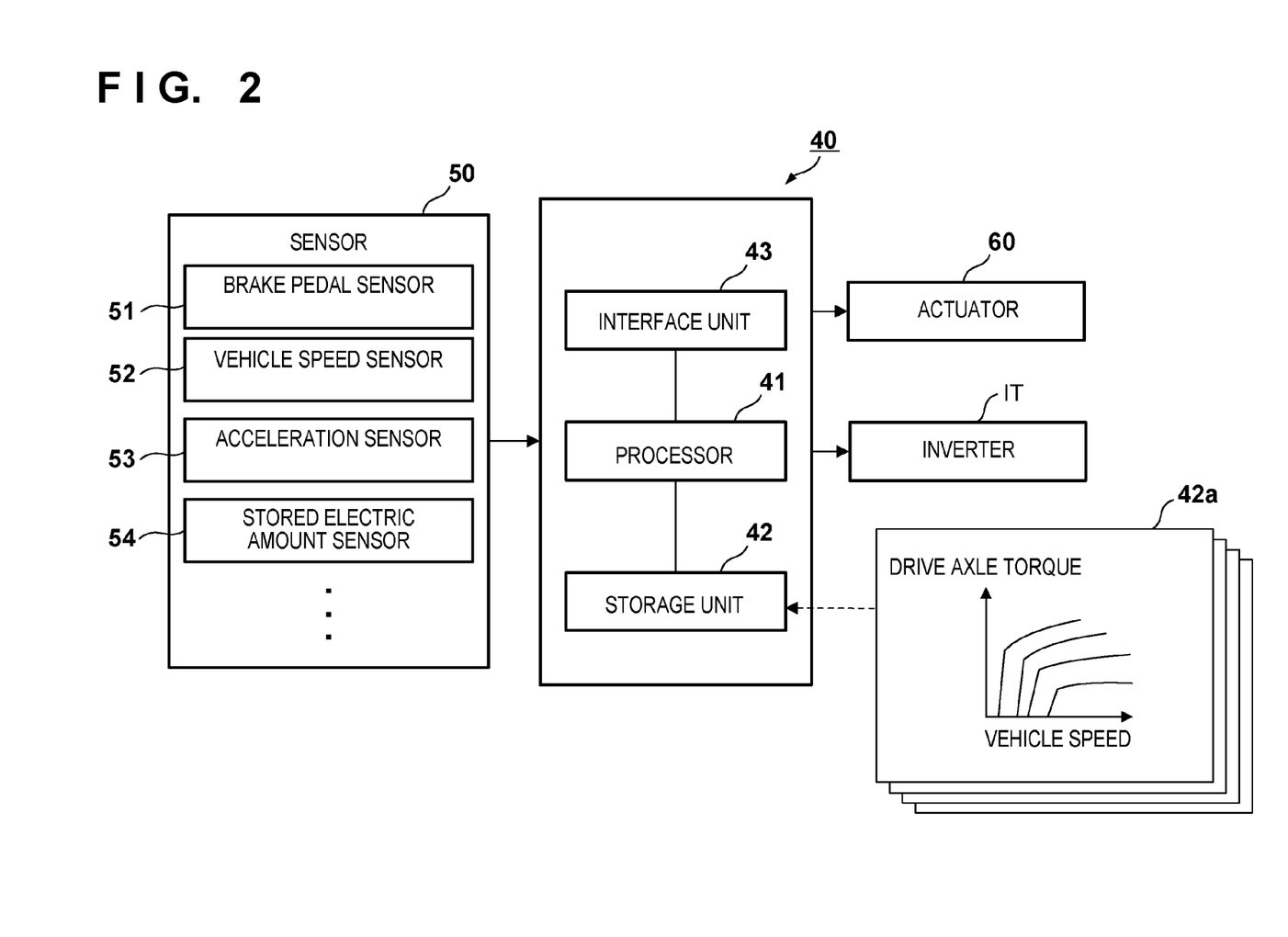
FIG. 2 is a block diagram of a control unit.

The arrangement of the control unit of the driving system of the hybrid vehicle according to this embodiment will be described below. FIG. 2 is a block diagram of the control unit 40.

The control unit 40 is capable of controlling a selection of the gear position in the first transmission mechanism 10 and the second transmission mechanism 20 and an engaging state of the first clutch C1 and the second clutch C2. The control unit 40 can select the gear position of the first transmission mechanism 10 and the second transmission mechanism 20 so as to reduce the speed of the mechanical power received by the main shaft (second input shaft) 21 and transmit the power to the main shaft (first input shaft) 11.

The control unit 40 includes a processor 41 such as a CPU, a storage unit 42 such as a RAM and ROM, and an interface unit 43 which interfaces between an external device and the processor 41.

The processor 41 executes programs stored in the storage unit 42, and controls various actuators 60 and the inverter IT based on detection results of various sensors 50. The sensors 50 include, for example, a brake pedal sensor 51, vehicle speed sensor 52, acceleration sensor 53, stored electric amount sensor 54, and the like, in association with a control example to be described later.

The brake pedal sensor 51 detects an operation and operation amount of a brake pedal by the driver. In this embodiment, it is determined that the driver issues a braking request during detection of the operation, and a braking request amount is set in proportion to the operation amount (application amount).

The vehicle speed sensor 52 detects the vehicle speed of the vehicle, and the acceleration sensor 53 detects an acceleration, especially, a decelerating acceleration of the vehicle. Note that the detections of the vehicle speed and acceleration can adopt a method of computing them based on other data in addition to a direct detection method. The stored electric amount sensor 54 detects a stored electric amount (remaining amount) of the battery BT. As the stored electric amount sensor 54, for example, a sensor which detects currents charged/discharged from the battery BT can be adopted, and a stored electric amount can be computed based on an integrated value of charged/discharged amounts.

The actuators 60 include actuators for driving the clutches C1 and C2 of the transmission 1, those for driving the respective shifters, those for driving the braking devices 4, and the like, and are, for example, motors, control valves, solenoids, and the like.

The storage unit 42 stores various data in addition to programs to be executed by the processor 41. FIG. 2 shows, as an example of such data, a shift change map 42a which specifies shift timings of the transmission. A plurality of different shift change maps 42a are prepared in correspondence with states and the like of the vehicle. The shift timings are set based on a traveling state of the vehicle. In this embodiment, the shift timings are basically specified based on the relationship between the vehicle speeds and drive axle torques. The drive axle torques are those of the drive axles 3. The drive axle torques can be directly detected by a sensor or can be computed based on states of the internal combustion engine Eg, electric motor M, and braking devices 4.

<Control Example>

Shift control of the transmission 1 and related control will be described below. The shift control of the transmission 1 is basically done based on a traveling state as a criterion with reference to the shift change maps 42a. Assume that shift-up operations are made level by level like 1st-speed→2nd-speed→3rd-speed→ . . . →7th-speed, and shift-down operations are similarly made level by level like 7th-speed→6th-speed→5th-speed→ . . . →1st-speed.

On the other hand, the transmission 1 of this embodiment has the arrangement in which the electric motor M is connected to the first transmission mechanism 10. Therefore, by positively adopting the 7th-, 5th-, 3rd-, and 1st-speed shift ranges as shift ranges of the first transmission mechanism 10 during the decelerating regeneration, more electric power can be collected. However, in order to change the shift ranges, the gears have to be changed. In this case, since the shifters are actuated, power transmission between the electric motor M and the drive wheels DW to the drive axles 3 are interrupted, and the braking force is weakened. Also, the electric motor M is often powered to adjust the rotational speed, and the braking force is also weakened. Such state may often cause the driver to feel unnatural.

Figure 4A:
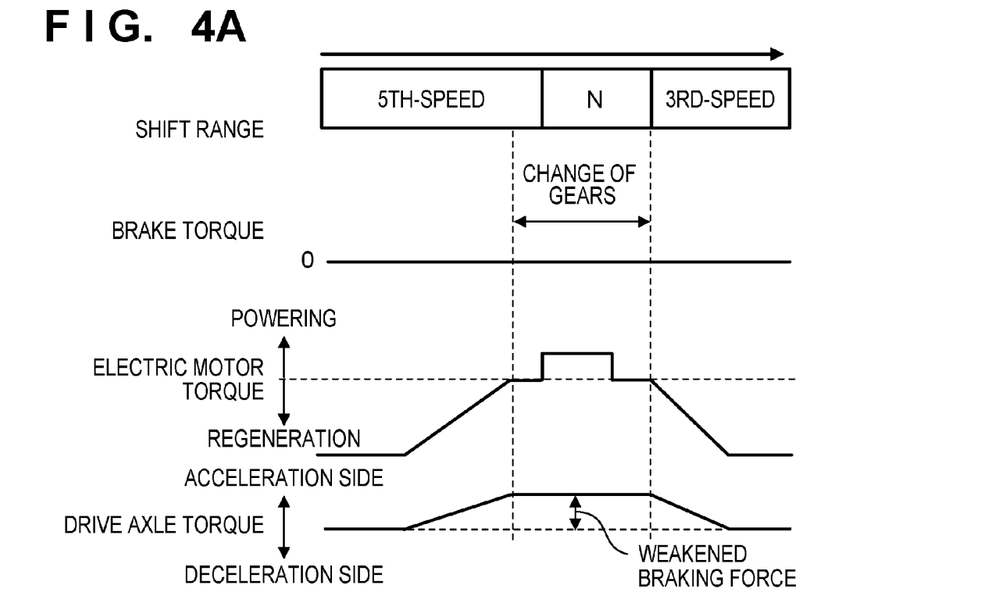
FIGS. 4A and 4B are timing charts of the shift control and brake control at the time of decelerating regeneration.

FIG. 4A is a timing chart showing changes of a brake torque of the braking devices 4, a torque of the electric motor M, and a torque of the drive axles 3 when the shift-down operation is made from the 5th-speed shift range to the 3rd-speed shift range. FIG. 4A exemplifies a case in which the shift-down operation is performed while a braking force is obtained by the decelerating regeneration of the electric motor M without actuating the braking devices 4 (N is a neutral position).

When the shift-down operation from the 5th-speed shift range to the 3rd-speed shift range is decided, the braking force by means of the decelerating regeneration of the electric motor M is gradually decreased to zero, and the gears begin to be changed. In the example of FIG. 4A, the electric motor M is powered to adjust the rotational speed during this period. During these periods, the drive axle torque is decreased on the deceleration side, and the braking force is weakened. After that, the 3rd-speed shift range is established, and the braking force by means of the decelerating regeneration of the electric motor M is increased, thus recovering the braking force.

Such state in which the braking force is weakened tends to seriously occur at the shift ranges on the lower-speed side, thus causing the driver to feel unnatural. However, even at the shift ranges on the higher-speed side, when a decelerating acceleration is large, the above state seriously occurs, and the driver feels unnatural.

Figure 3:
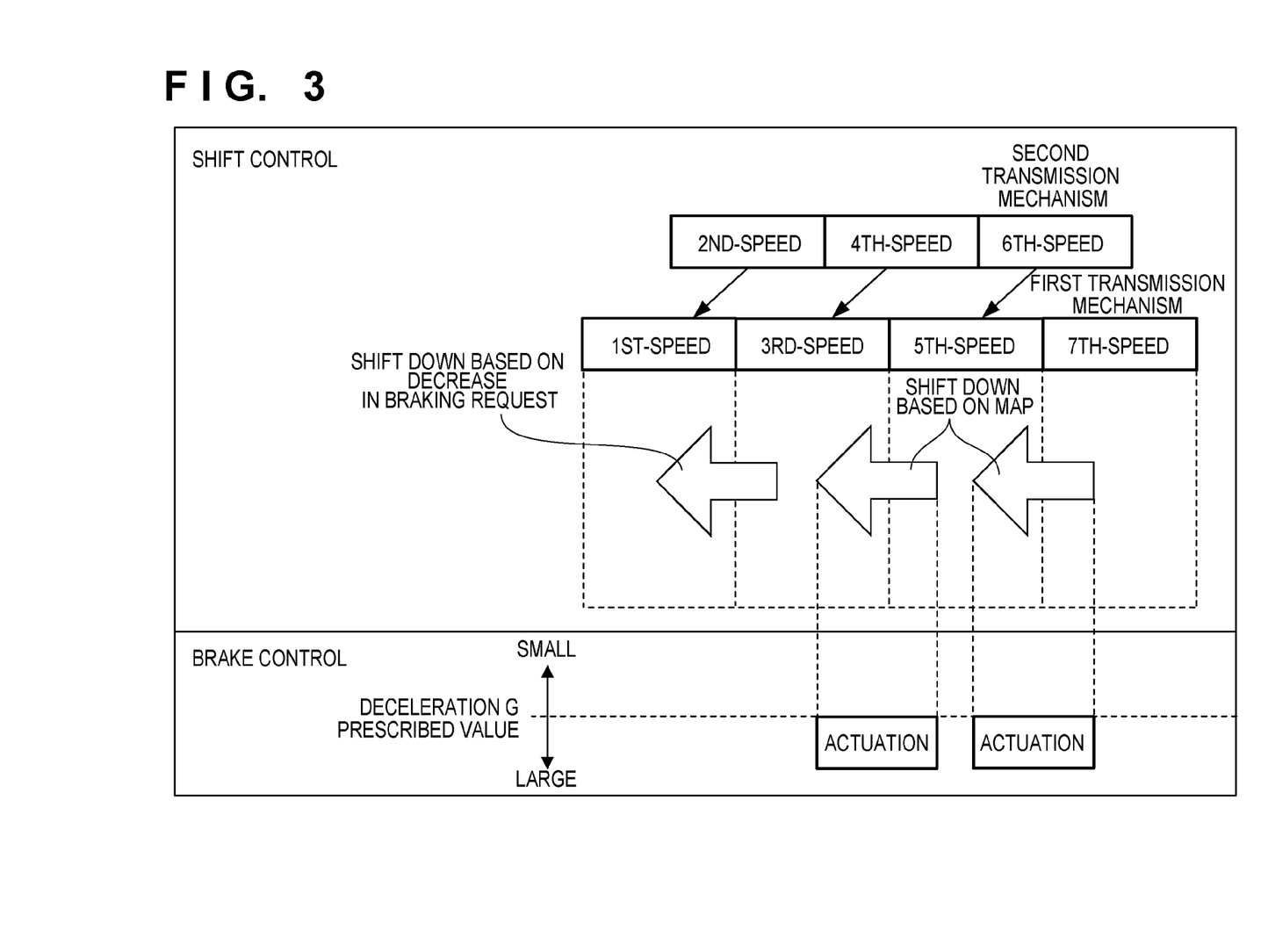
FIG. 3 is an explanatory view of shift control and brake control at the time of decelerating regeneration.

The control contents of this embodiment, which consider the aforementioned points, will be described below with reference to FIG. 3. FIG. 3 shows the contents of shift control and brake control when the decelerating regeneration is made in response to a braking request of the driver.

When the driver issues a braking request, and it is possible to make the decelerating regeneration, if the currently selected shift range is that (2nd, 4th, or 6th) of the second transmission mechanism 20, the shift range is changed to that (1st, 3rd, 5th, or 7th) of the first transmission mechanism 10. FIG. 3 exemplifies a case in which the shift range is changed to that lower by one level. After that, shift-down operations are made using the shift ranges (1st, 3rd, 5th, and 7th) of the first transmission mechanism 10. By preferentially using the first transmission mechanism 10 to which the electric motor M is connected, an insufficient collection of electric power can be suppressed.

Note that the following method can also be adopted. That is, when the driver issues a braking request, and it is possible to make the decelerating regeneration, if the currently selected shift range is that (2nd, 4th, or 6th) of the second transmission mechanism 20, the shift range is changed to that (1st, 3rd, 5th, or 7th) of the first transmission mechanism 10 based on a traveling state as a criterion with reference to the shift change maps 42a, the decelerating regeneration is then started, and shift-down operations are subsequently made using the shift ranges (1st, 3rd, 5th, and 7th) of the first transmission mechanism 10. However, higher collection efficiency of electric power can be assured when the shift range is immediately changed to that (1st, 3rd, 5th, or 7th) of the first transmission mechanism 10, as described above.

When the driver issues neither a deceleration request nor an acceleration request, and the vehicle is free-wheeling, if the currently selected shift range is that (2nd, 4th, or 6th) of the second transmission mechanism 20, the shift range may be changed to that (1st, 3rd, 5th, or 7th) of the first transmission mechanism 10. Since a deceleration request is likely to be issued next, the shift range is changed in advance to that (1st, 3rd, 5th, or 7th) of the first transmission mechanism 10. In this case, either a shift-up or shift-down operation may be made.

Subsequently, referring to FIG. 3, after it is confirmed that the shift range (1st, 3rd, 5th, or 7th) of the first transmission mechanism 10 is selected, the decelerating regeneration is started. Shift-down operations are basically made in the order of 7th-speed→5th-speed→3rd-speed→1st-speed. A shift change operation of 7th-speed→5th-speed and that of 5th-speed→3rd-speed are made based on a traveling state as a criterion with reference to the shift change maps 42a.

Figure 4B:
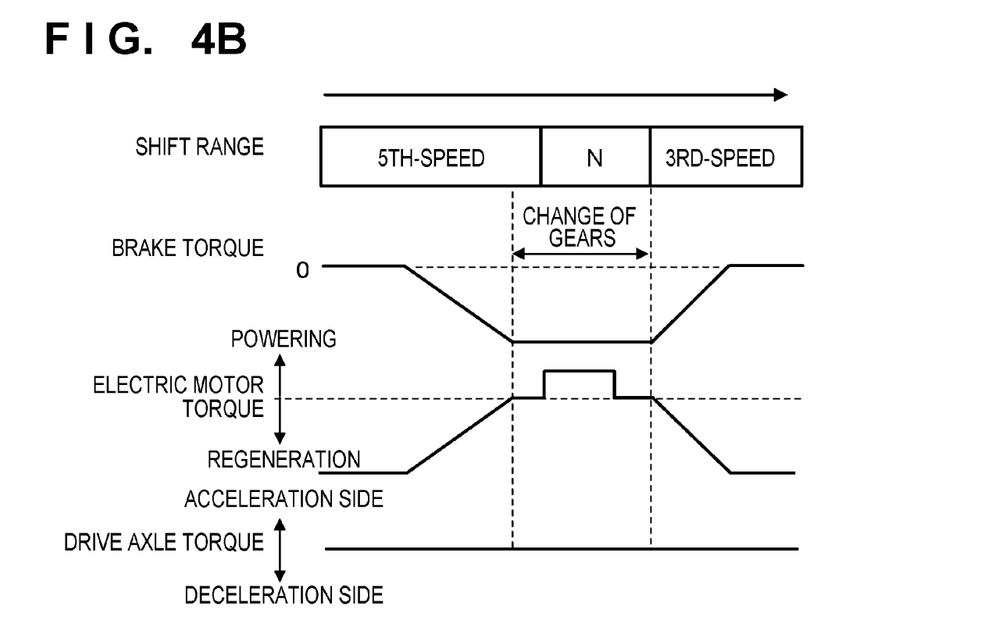

In this case, the braking force is weakened, as described above. However, when a decelerating acceleration is small, since the braking force is not considerably weakened, no control is made. On the other hand, when a decelerating acceleration is large, the braking devices 4 are actuated. For example, this is the case when the decelerating acceleration exceeds 0.15 G. In this case, the braking devices 4 are actuated in cooperation with the decelerating regeneration of the electric motor M so as to attain a constant braking force. FIG. 4B is a timing chart showing changes of the braking torque of the braking devices 4, the torque of the motor M, and that of the drive axles 3 when, for example, the braking devices 4 are cooperatively actuated in case of the shift-down operation of the 5th-speed shift range to the 3rd-speed shift range.

When the shift-down operation from the 5th-speed shift range to the 3rd-speed shift range is decided, the braking force by means of the decelerating regeneration of the electric motor M is gradually decreased to zero, and the gears begin to be changed. In this case, since the decelerating torque of the braking devices 4 is increased cooperatively with a change in braking force by the electric motor M, the drive axle torque is constant. Thus, a weakened braking force can be compensated for, and the unnatural feeling of the driver can be eliminated.

Referring back to FIG. 3, the shift change operation of 3rd-speed to 1st-speed will be explained. The shift change operation of 3rd-speed to 1st-speed is made without referring to the shift change maps 42a when the braking request amount of the driver is decreased by a predetermined amount (when the application amount of the brake pedal is reduced by a predetermined amount). When the braking request amount of the driver is decreased, the driver plans to decrease the braking force. Hence, even when the braking force is temporarily weakened by making the shift-down operation to have such decrease in braking request amount as a trigger, the driver does not feel so unnatural. When the braking request amount is not decreased by the predetermined amount, the 3rd-speed shift range is maintained. Thus, the decelerating regeneration can be continued, and an insufficient collection of electric power can be suppressed. When a state in which the braking request amount is not decreased by the predetermined amount continues, the vehicle is brought to stop while maintaining the 3rd-speed shift range, thus maximally collecting electric power.

The predetermined amount used as a threshold upon determination may be either a fixed value or variable value. When the variable value is used, for example, the predetermined amount can be set based on a ratio to a maximum value of a current braking request amount. In either case, the predetermined amount is preferably set at a level at which the driver surely intends to decrease the driving force. For example, about 30% to 40% of a pedal stroke may be used as a criterion.

This shift-down control based on a decrease in braking request amount of the driver can be adopted not only in the shift change operation of 3rd-speed→1st-speed but also in that of 5th-speed→3rd speed. However, relatively at lower-speed shift ranges, when the braking force is temporarily weakened upon making the shift-down operation, the driver tends to feel unnatural. Hence, the aforementioned shift-down control is particularly effect for that at lower-speed shift ranges, thus effectively eliminating the unnatural feeling of the driver.

For this reason, as a target shift range, that to be selected at a predetermined vehicle speed or less (for example, 40 km/h or less and, preferably, 30 km/h or less) is preferably selected based on the criterion of the shift change maps 42a. More preferably, of the shift ranges attained by the transmission mechanism to which the electric motor M is connected as in this embodiment, the second lowest-speed shift range is selected.

Note that the same control can be applied to, for example, the arrangement in which the electric motor M is connected to the second transmission mechanism 20. In this case, a shift-down operation of 6th-speed→4th-speed can be attained by the shift-down control method of making that shift-down operation with reference to the shift change maps 42a, and actuating the braking devices 4 when a decelerating acceleration is large (in the same manner as in the aforementioned shift-down operation of 7th-speed→5th-speed and that of 5th-speed→3rd-speed). Also, a shift-down operation of 4th-speed→2nd-speed can be attained by the shift-down control based on a decrease in braking request amount. In this embodiment, the first transmission mechanism 10 has charge of the odd shift ranges, and the second transmission mechanism 20 has charge of the even shift ranges. However, when different assignments of shift ranges are adopted, the aforementioned control can be adopted.

A practical example of control to be executed by the processor 41 will be described below.

<Decelerating Regeneration Control>

Figure 5A:
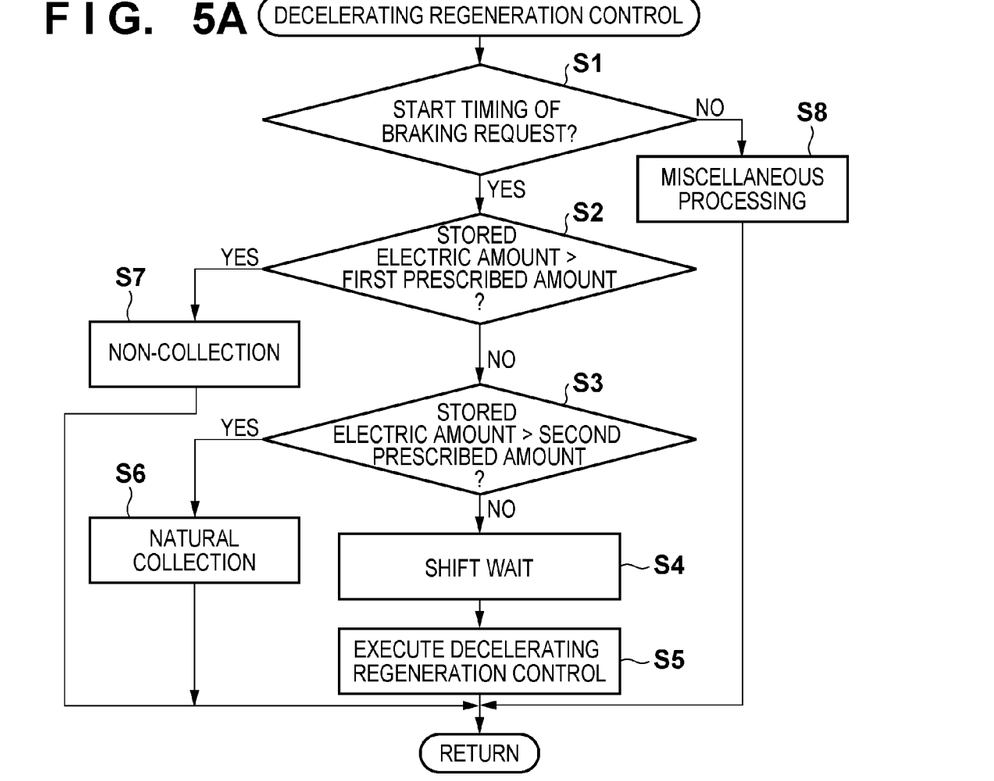
FIG. 5A is a flowchart of decelerating regeneration control.

FIG. 5A is a flowchart showing an example of decelerating regeneration control, and is mainly associated with determination processing of an execution start timing of the decelerating regeneration.

The processor 41 determines a start timing of a braking request of the driver in step S1. When the detection result of the brake pedal operation of the driver by the brake pedal sensor 51 changes from a non-detection state to a detection state, the processor 41 determines the start timing of the braking request. If Yes in S1, the process advances to step S2; otherwise, the process advances to step S8. In step S8, the processor 41 executes miscellaneous processing. In this step, the processor 41 executes processing during execution of the decelerating regeneration, processing associated with an end timing of the decelerating regeneration upon completion of the braking request, processing for determining whether or not to execute the decelerating regeneration under conditions other than the braking request, or the like.

The processor 41 checks in step S2 whether or not the stored electric amount of the battery BT exceeds a first prescribed amount. If Yes in step S2, the process advances to step S7; otherwise, the process advances to step S3. The processor 41 checks in step S3 whether or not the stored electric amount of the battery BT exceeds a second prescribed amount. If Yes in step S3, the process advances to step S6; otherwise, the process advances to step S4.

Figure 5B:
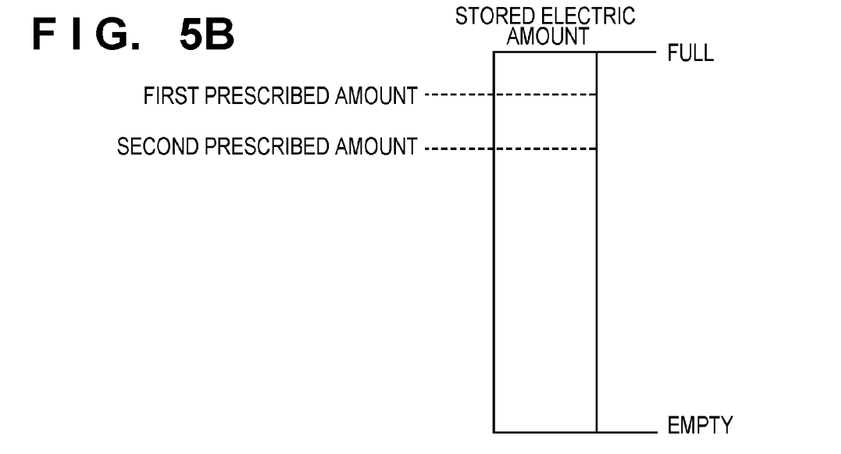
FIG. 5B is an explanatory view of prescribed amounts of a stored electric amount.

FIG. 5B is an explanatory view of the prescribed amounts of the stored electric amount. In this embodiment, assume that the first prescribed amount corresponds to a stored electric amount, which is almost fully charged, and is improper to be charged any more, and the second prescribed amount corresponds to a stored electric amount which reaches a required stored electric amount, but has room to be charged.

In step S4, the processor 41 executes shift wait processing as a preparation for execution of the decelerating regeneration control in step S5. In this step, when the currently selected shift range is that (2nd, 4th, or 6th) of the second transmission mechanism 20, the processor 41 executes processing for delaying processing by a time required to change the currently selected shift range to that (1st, 3rd, 5th, or 7th) of the first transmission mechanism 10, as shown in FIG. 3. If the currently selected shift range is that (1st, 3rd, 5th, or 7th) of the first transmission mechanism 10, the process advances to step S5 without executing any wait processing.

In step S5, the processor 41 outputs a control command to the inverter IT to execute the decelerating regeneration control by the electric motor M. A braking force during the decelerating regeneration is preferably that according to the braking request amount of the driver. In step S6, the processor 41 naturally collects electric power. Since the stored electric amount exceeds the second prescribed amount, a charging amount is limited. For this reason, in this step, the inverter IT sets only a state in which the battery BT and electric motor M are electrically connected, and electricity naturally generated by rotation of the rotor Mr is charged on the battery BT. When the shift range (1st, 3rd, 5th, or 7th) of the first transmission mechanism 10 is selected, the battery BT is often charged by this natural collection. In step S7, the processor 41 skips collection. Since the stored electric amount exceeds the first prescribed amount, it is not desired to charge the battery BT. For this reason, in this step, the inverter IT sets a state in which the battery BT and electric motor M are electrically disconnected. With the above steps, processing for one unit is complete.

<Shift Control>

Figure 6:
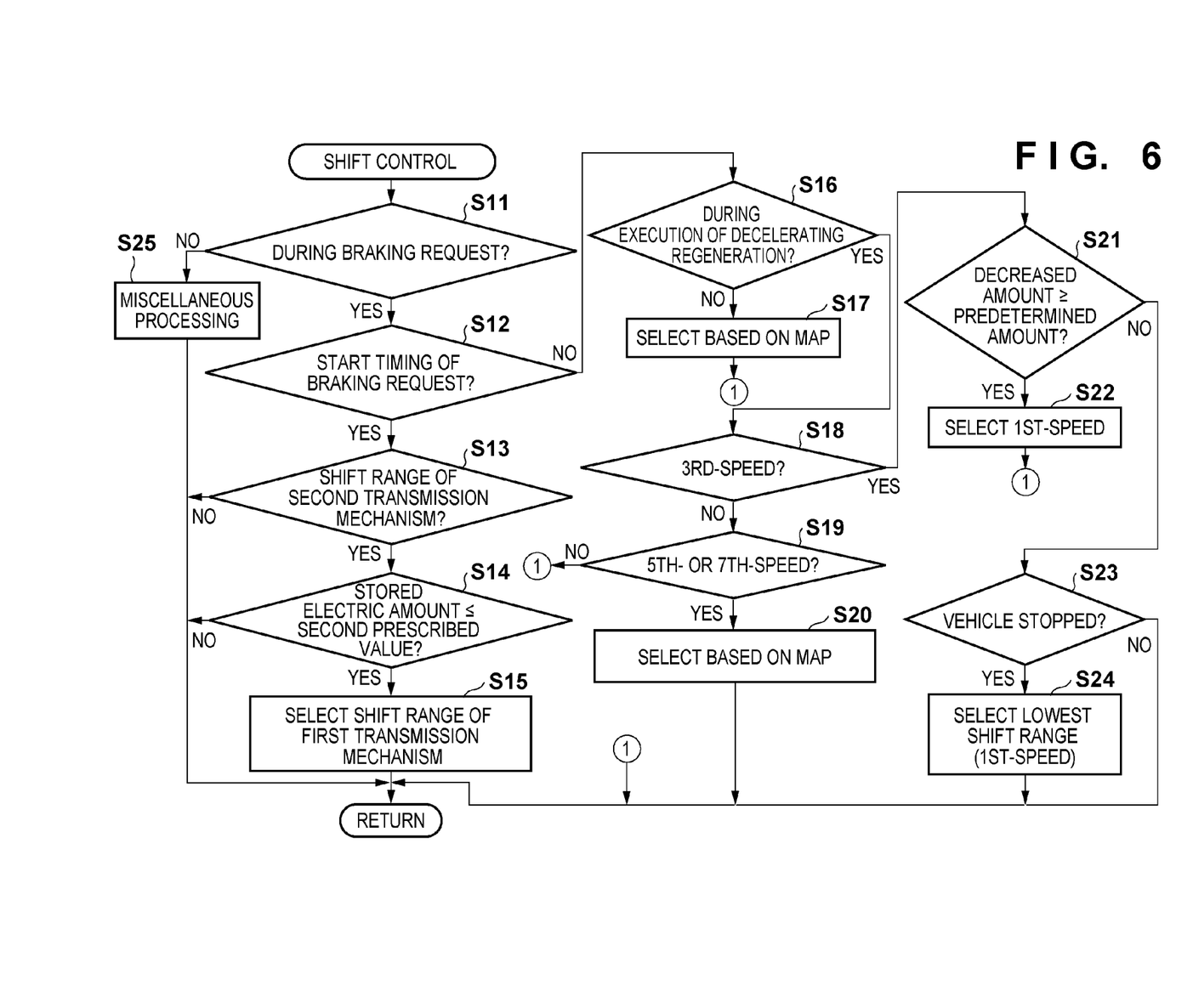
FIG. 6 is a flowchart of shift control.

Shift control will be described below with reference to FIG. 6. FIG. 6 is a flowchart of the shift control, and is mainly associated with that during execution of the decelerating regeneration.

The processor 41 checks in step S11 whether or not the driver is issuing a braking request. When the detection result of the operation of the brake pedal of the driver by the brake pedal sensor 51 indicates a detection state, the processor 41 determines that the driver is issuing the braking request. If Yes in step S11, the process advances to step S12; otherwise, the process advances to step S25. In step S25, the processor 41 executes miscellaneous processing. In this case, the processor 41 executes shift control at the time of, for example, an acceleration request based on the shift change maps 42a.

The processor 41 determines a start timing of the braking request of the driver in step S12. When the detection result of the brake pedal operation of the driver by the brake pedal sensor 51 changes from a non-detection state to a detection state, the processor 41 determines the start timing of the braking request. If Yes in step S12, the process advances to step S13; otherwise, the process advances to step S16. The processor 41 checks in step S13 whether or not the currently selected shift range is that (2nd, 4th, or 6th) of the second transmission mechanism 20. If Yes in step S13, the process advances to step S14; otherwise, since the currently selected shift range is that (1st, 3rd, 5th, or 7th) of the first transmission mechanism 10, the control unit 10 ends processing for one unit.

The processor 41 checks in step S14 whether or not the stored electric amount of the battery BT exceeds the second prescribed amount. If Yes in step S14 (if the decelerating regeneration is to be started (S5)), the process advances to step S15; otherwise, the processor 41 ends processing for one unit. In step S15, the processor 41 selects the shift range (1st, 3rd, 5th, or 7th) of the first transmission mechanism 10, thus ending processing for one unit. After that, the decelerating regeneration is started in the process of step S5.

The processor 41 checks in step S16 if the decelerating regeneration is being executed. If Yes in step S16, the process advances to step S18; otherwise (natural collection or non-collection), the process advances to step S17. In step S17, the processor 41 executes shift control based on the shift change maps 42a. The processor 41 checks in step S18 whether or not the currently selected shift range is 3rd-speed. If Yes in step S18, the process advances to step S21; otherwise, the process advances to step S19. The processor 41 checks in step S19 whether or not the currently selected shift range is 5th- or 7th-speed. If Yes in step S19, the process advances to step S20; otherwise (1st-speed), the processor 41 ends processing for one unit. In step S20, the processor 41 executes shift control based on the shift change maps 42a.

The processor 41 checks in step S21 whether or not a decreased amount of the braking request amount of the driver is equal to or larger than a predetermined amount. If Yes in step S21, the process advances to step S22; otherwise (3rd-speed is maintained during execution of the decelerating regeneration), the process advances to step S23. In step S22, the processor 41 makes a shift-down operation from 3rd-speed to 1st-speed, thus ending processing for one unit. The processor 41 checks in step S23 whether or not the vehicle is brought to stop. When the detection result of the vehicle speed sensor 52 indicates a vehicle speed=0 km/h, the processor 41 determines that the vehicle is brought to stop. If Yes in step S23, the process advances to step S24; otherwise (3rd-speed is maintained during execution of the decelerating regeneration), the processor 41 ends processing for one unit.

When the control reaches step S24, the vehicle is brought to stop while maintaining 3rd-speed during execution of the decelerating regeneration, and no more electric power is collected. Hence, the processor 41 shifts down to the lowest shift range (1st-speed). That is, a shift-down operation from 3rd-speed to 1st-speed is performed. This allows smooth next start, thus improving the drivability of the driver. Thus, processing for one unit is complete.

<Brake Control>

Figure 7:
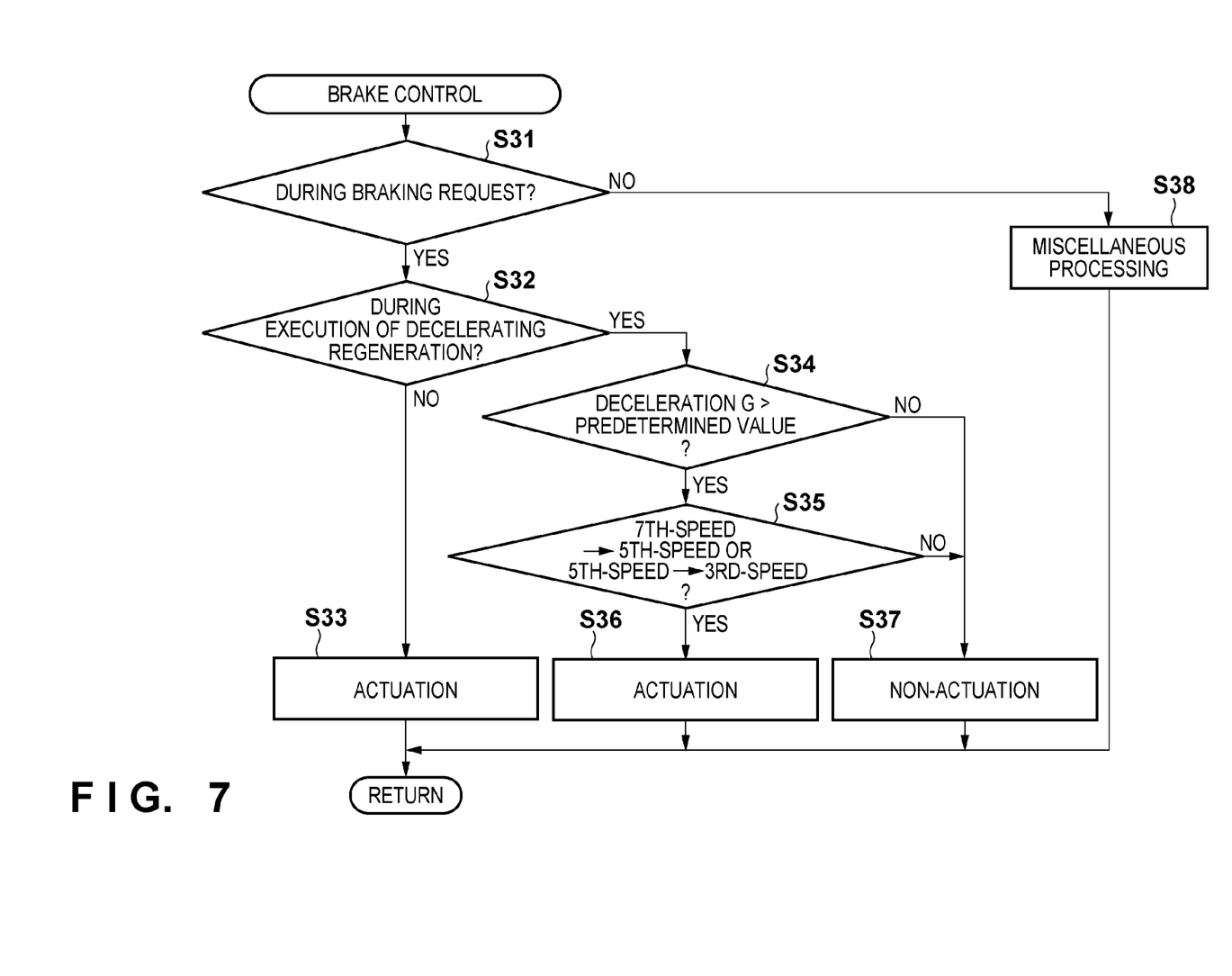
FIG. 7 is a flowchart of brake control.

Control of the braking device 4 will be described below with reference to FIG. 7. FIG. 7 is a flowchart of the brake control, and is mainly associated with shift control during execution of the decelerating regeneration.

The processor 41 checks in step S31 whether or not the driver is issuing a braking request. When the detection result of the operation of the brake pedal of the driver by the brake pedal sensor 51 indicates a detection state, the processor 41 determines that the driver is issuing the braking request. If Yes in step S31, the process advances to step S32; otherwise, the process advances to step S38. In step S38, the processor 41 executes miscellaneous processing. In this step, the processor 41 executes, for example, control of the braking devices 4 for attitude control of the vehicle.

The processor 41 checks in step S32 whether or not the decelerating regeneration is being executed. If Yes in step S32, the process advances to step S34; otherwise (natural collection or non-collection), the process advances to step S33. In step S33, the processor 41 actuates the braking devices 4. When the stored electric amount of the battery BT is large, since it is improper to store electric power by the decelerating regeneration, the braking devices 4 are used in preference to the decelerating regeneration, thus assuring a required braking force. In this case, the braking force of the braking devices 4 is preferably that according to the braking request amount of the driver.

The processor 41 checks in step S34 whether or not a decelerating acceleration exceeds a predetermined value. The decelerating acceleration is based on the detection result of the acceleration sensor 53. If Yes in step S34, the process advances to step S35; otherwise, the process advances to step S37. The processor 41 checks in step S35 whether or not a shift-down operation of 7th-speed→5th speed or of 5th-speed→3rd-speed is being made. If Yes in step S35, the process advances to step S36; otherwise, the process advances to step S37. In step S37, the processor 41 does not actuate the braking devices 4.

In step S36, the processor 41 actuates the braking devices 4. This case corresponds to that described with "actuation" in FIG. 3. Hence, the deceleration torque of the braking devices 4 is controlled cooperatively with a change in braking force by the electric motor M. Thus, processing for one unit is complete.

<Clutch Control>

Figure 8:
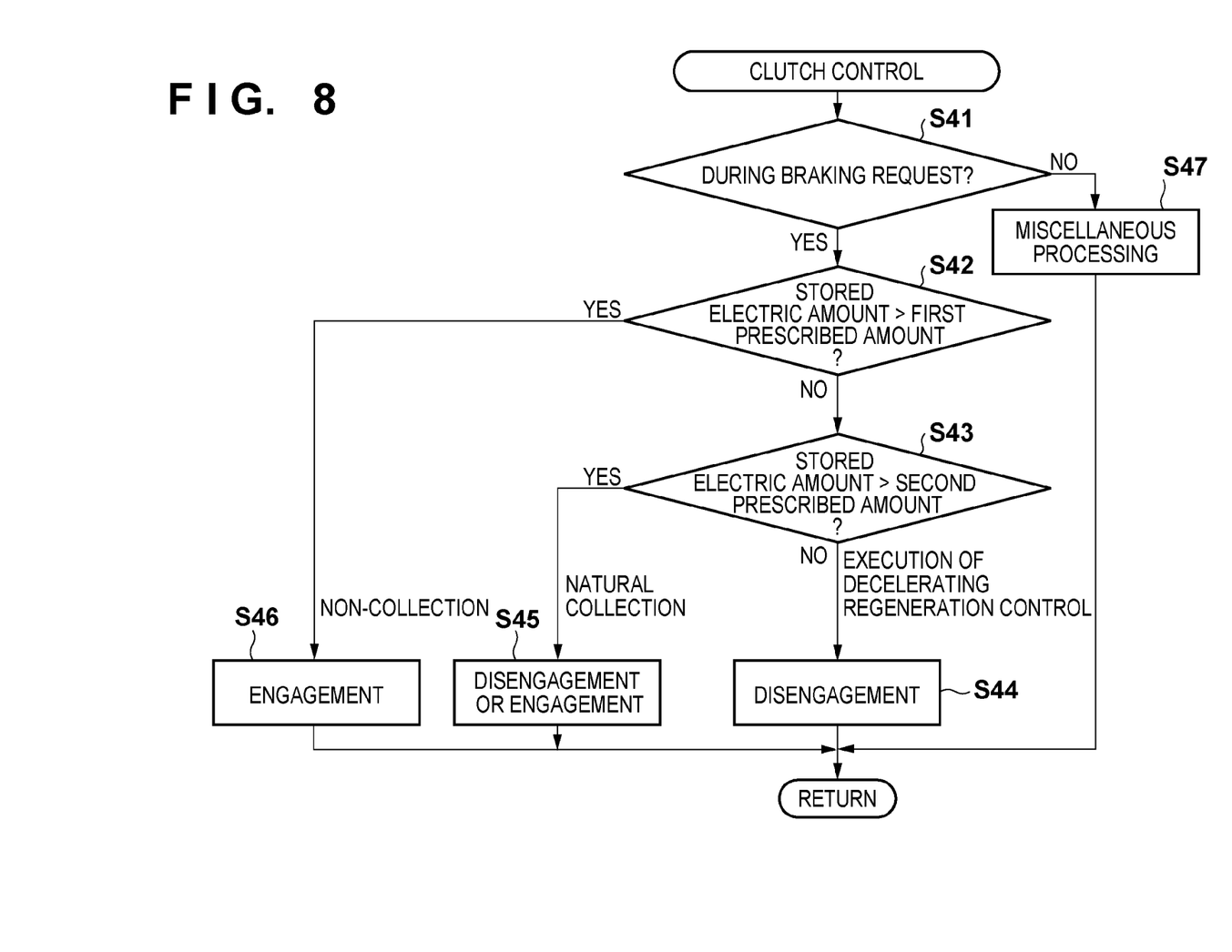
FIG. 8 is a flowchart of clutch control.

Control of the clutches C1 and C2 will be described below with reference to FIG. 8. FIG. 8 is a flowchart of clutch control, and is mainly associated with use/non-use of an engine brake by the internal combustion engine Eg during braking.

The processor 41 checks in step S41 whether or not the driver is issuing a braking request. When the detection result of the operation of the brake pedal of the driver by the brake pedal sensor 51 indicates a detection state, the processor 41 determines that the driver is issuing the braking request. If Yes in step S41, the process advances to step S42; otherwise, the process advances to step S47. In step S47, the processor 41 executes miscellaneous processing.

The processor 41 checks in step S42 whether or not the stored electric amount of the battery BT exceeds the first prescribed amount. If Yes in step S42, the process advances to step S46; otherwise, the process advances to step S43. The processor 41 checks in step S43 whether or not the stored electric amount of the battery BT exceeds the second prescribed amount. If Yes in step S43, the process advances to step S45; otherwise, the process advances to step S44.

When the control reaches step S44, since the decelerating regeneration is being executed, the clutch is disengaged. During the decelerating regeneration, since the shift range of the first transmission mechanism 10 is selected, the clutch C1 is set in a disengaged state. Since no engine brake is effected, power generation efficiency by the decelerating regeneration of the electric motor M can be improved.

When the control reaches step S45, electric power is being naturally collected. In this case, engagement/disengagement of the clutches is selected according to the braking request amount of the driver. When the braking request amount is larger than a predetermined amount, the clutch is engaged to effect the engine brake. The clutch to be engaged is the clutch C1 when the shift range of the first transmission mechanism 10 is selected or the clutch C2 when the shift range of the second transmission mechanism is selected. When the braking request amount is equal to or smaller than the predetermined amount, the clutch is disengaged to allow natural collection.

When the control reaches step S46, electric power is not collected. In this case, since no braking force by means of the electric motor M is obtained, the clutch is engaged to effect the engine brake. When the stored electric amount is large, since it is improper to store electric power by the decelerating regeneration, the engine brake can be used to assure a required braking force. The clutch to be engaged is the clutch C1 when the shift range of the first transmission mechanism 10 is selected or the clutch C2 when the shift range of the second transmission mechanism is selected. Thus, processing for one unit is complete.

<Second Embodiment>

The aforementioned control processes are applicable to a transmission which is different from the transmission 1 of the first embodiment. For example, in the transmission 1, the main shafts 11 and 21 adopt coaxial multiple structures. Alternatively, an arrangement in which these main shafts are parallelly arranged can be adopted.

Figure 9:
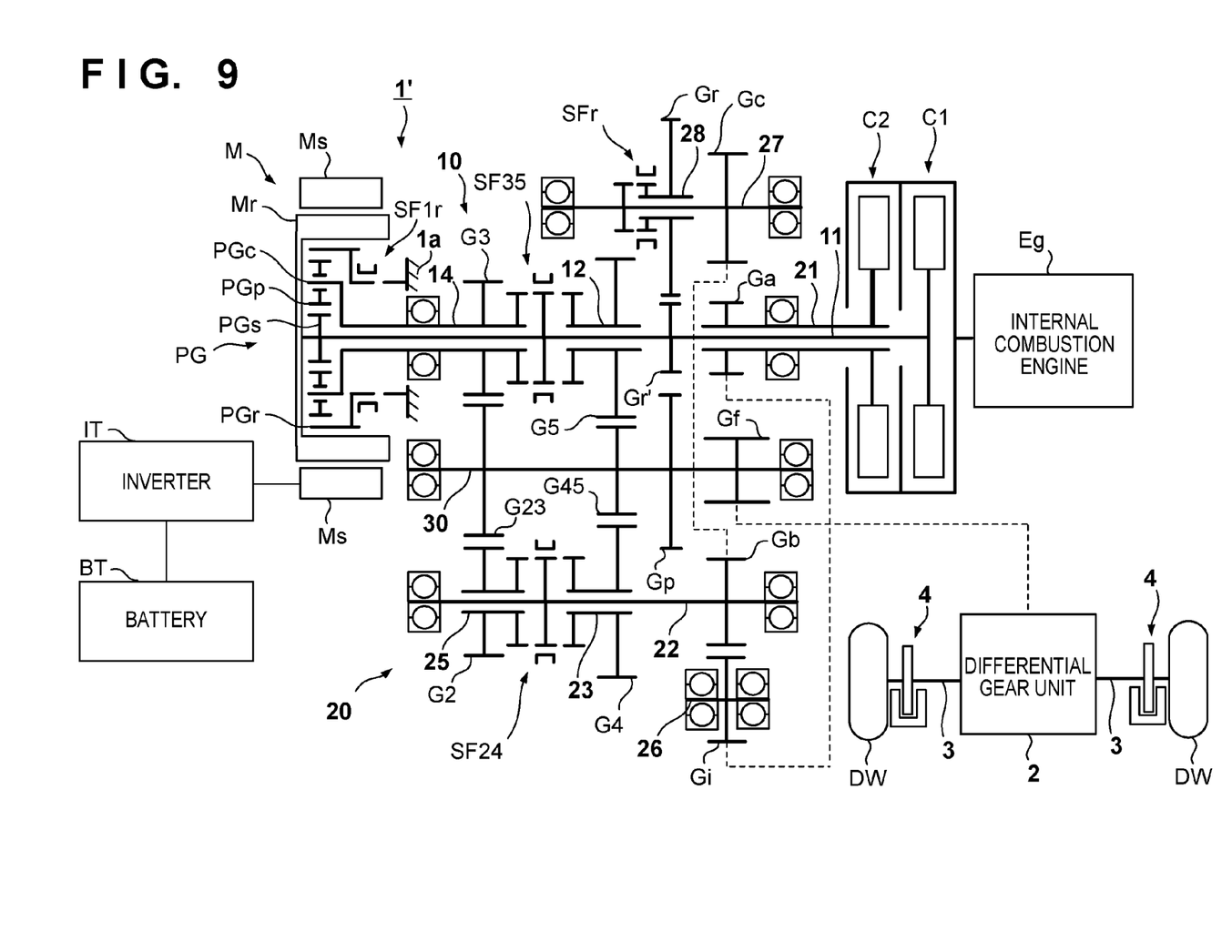
FIG. 9 is a schematic view showing a hybrid vehicle according to another embodiment of the present invention.

The number of shift ranges is not limited to that of the transmission 1. FIG. 9 is a schematic view of a hybrid vehicle according to another embodiment of the present invention. A transmission 1' shown in FIG. 9 is that having five forward shift ranges and one reverse shift range, and its basic arrangement is common to that of the transmission shown in FIG. 1. Hence, the same reference numerals denote components corresponding to those of the transmission 1, a description thereof will not be repeated, and only different components will be explained.

The transmission 1' does not include the driving gears G6 and G7, driven gear G67, shifters SF37, SF5, SF4, and SF26, and coupling shafts 13 and 14 of the transmission 1. Conversely, the transmission 1' includes a 3rd/5th-speed shifter SF35 and 2nd/4th-speed shifter SF24. The shifter SF35 attains engagement/disengagement between the main shaft 11 and coupling shaft 14 (driving gear G3), and that between the main shaft 11 and coupling shaft 12 (driving gear G5). The shifter SF24 attains engagement/disengagement between the intermediate shaft 22 and coupling shaft 25 (driving gear G2) and that between the intermediate shaft 22 and coupling shaft 23 (driving gear G4).

A mode upon selection of respective shift ranges when the internal combustion engine Eg is used as a driving source will be described below. Cases of the 1st-, 3rd-, and 5th-speed shift ranges will be described first. Upon selection of these shift ranges, the clutch C1 is set in an engaged state, and the clutch C2 is set in a disengaged state.

In case of the 1st-speed shift range, the shifter SF1r sets the ring gear PGr of the planetary gear train PG and the transmission case 1a in an engaged state. Then, a driving force is transmitted along a route [internal combustion engine Eg→clutch C1→main shaft 11•sun gear PGs→pinion gear PGp•carrier PGc•coupling shaft 14•driving gear G3→driven gear G23•counter shaft 30•output gear Gf→differential gear unit 2], thus attaining the 1st-speed shift range.

In case of the 3rd-speed shift range, the shifter SF35 sets the main shaft 11 and coupling shaft 14 in an engaged state. Then, a driving force is transmitted along a route [internal combustion engine Eg→clutch C1→main shaft 11•coupling shaft 14•driving gear G3→driven gear G23•counter shaft 30•output gear Gf→differential gear unit 2], thus attaining the 3rd-speed shift range.

In case of the 5th-speed shift range, the shifter SF35 sets the main shaft 11 and coupling shaft 12 in an engaged state. Then, a driving force is transmitted along a route [internal combustion engine Eg→clutch C1→main shaft 11•coupling shaft 12•driving gear G5→driven gear G45•counter shaft 30•output gear Gf→differential gear unit 2], thus attaining the 5th-speed shift range.

Upon selection of the 2nd- and 4th-speed shift ranges, the clutch C1 is set in a disengaged state, and the clutch C2 is set in an engaged state.

In case of the 2nd-speed shift range, the shifter SF24 sets the intermediate shaft 22 and coupling shaft 25 in an engaged state. Then, a driving force is transmitted along a route [internal combustion engine Eg→clutch C2→main shaft 21•gear Ga→idle gear Gi→gear Gb•intermediate shaft 22•coupling shaft 25•driving gear G2→driven gear G23•counter shaft 30•output gear Gf→differential gear unit 2], thus attaining the 2nd-speed shift range.

In case of the 4th-speed shift range, the shifter SF24 sets the intermediate shaft 22 and coupling shaft 23 in an engaged state. Then, a driving force is transmitted along a route [internal combustion engine Eg→clutch C2→main shaft 21•gear Ga→idle gear Gi→gear Gb•intermediate shaft 22•coupling shaft 23•driving gear G4→driven gear G45•counter shaft 30•output gear Gf→differential gear unit 2], thus attaining the 4th-speed shift range.

Upon selection of the reverse shift range, the clutch C1 is set in a disengaged state, and the clutch C2 is set in an engaged state. Then, the shifter SFr sets the intermediate shaft 27 and coupling shaft 28 in an engaged state, and the shifter SF1r sets the ring gear PGr of the planetary gear train PG and the transmission case 1a in an engaged state. Then, a driving force is transmitted along a route [internal combustion engine Eg→clutch C2→main shaft 21•gear Ga→idle gear Gi→gear Gb→gear Gc•intermediate shaft 27•coupling shaft 28•driving gear Gr→driven gear Gr'•main shaft 11•sun gear PGs→pinion gear PGp•carrier PGc•coupling shaft 14•driving gear G3→driven gear G23•counter shaft 30•output gear Gf→differential gear unit 2], thus attaining the reverse shift range.

In this way, although the transmission 1' does not include 6th- and 7th-speeds compared to the transmission 1, the same control processes as those in the first embodiment using the transmission 1 can be executed except for this point.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-252926, filed Nov. 11, 2010, which is hereby incorporated by reference herein in its entirety.

What is claimed is:
1. A hybrid vehicle, comprising:
a first transmission mechanism and a second transmission mechanism,
an electric motor connected to the first transmission mechanism, an internal combustion engine, an output shaft of said internal combustion engine capable of engaging with a first input shaft of said first transmission mechanism and a second input shaft of said second transmission mechanism, a motor control unit configured to execute decelerating regeneration by the electric motor during a braking request of a driver, and a transmission control unit configured to control a shift range, wherein when said motor control unit executes the decelerating regeneration in response to the braking request of the driver while a predetermined shift range attained by the first transmission mechanism is selected, and (i) when a braking request amount of the braking request is decreased by a predetermined amount, the transmission control unit decides a shift-down and change a shift range to a shift range on a lower-speed side than the predetermined shift range, which is attained by the first transmission mechanism, and ii) when the braking request amount is not decreased, the transmission control unit maintains the predetermined shift range.

2. The vehicle according to claim 1, further comprising frictional braking devices of a brake-by-wire type configured to decelerate said hybrid vehicle, and a brake control unit configured to control said frictional braking devices.

3. The vehicle according to claim 2, wherein when said motor control unit executes the decelerating regeneration in response to the braking request of the driver, when said transmission control unit shifts down from a shift range on a higher-speed side than the predetermined shift range, which is attained by the first transmission mechanism, to a shift range on a lower-speed side than the shift range on the higher-speed side, and when a decelerating acceleration of said hybrid vehicle exceeds a predetermined value, said brake control unit actuates said frictional braking devices, and when the decelerating acceleration does not exceed the predetermined value, said brake control unit does not actuate said frictional braking devices.

4. The vehicle according to claim 2, further comprising a battery configured to store electric power generated by the electric motor, wherein when a stored electric amount of said battery exceeds a prescribed amount, said brake control unit actuates said frictional braking devices in response to a braking request of the driver, and said motor control unit does not execute the decelerating regeneration.

5. The vehicle according to claim 4, further comprising a battery configured to store electric power generated by the electric motor, wherein when the stored electric amount of said battery exceeds the prescribed amount, the internal combustion engine and the transmission mechanism, which attains a currently selected shift range, of the first transmission mechanism and the second transmission mechanism are set in an engaged state in response to a braking request of the driver.

6. The vehicle according to claim 1, wherein when a braking request of the driver is issued, and when a currently selected shift range is a shift range, which is attained by the second transmission mechanism, said transmission control unit changes the shift range to a shift range, which is attained by the first transmission mechanism.

7. The vehicle according to claim 1, wherein when said hybrid vehicle is brought to stop while maintaining the predetermined shift range since the braking request amount is not decreased by the predetermined amount, said transmission control unit changes a shift range to a lowest shift range.

8. The vehicle according to claim 1, wherein the predetermined shift range is a shift range selected at not more than a predetermined vehicle speed.

9. The vehicle according to claim 1, wherein the predetermined shift range is a second lowest shift range of shift ranges, which are attained by the first transmission mechanism.

10. The vehicle according to claim 1, wherein the electric motor is not connected to the second transmission mechanism.

11. The vehicle according to claim 1, wherein the electric motor is connected to a main shaft of the first transmission and is not connected to a main shaft of the second transmission.

* * * * *